Nov. 8, 1960

T. S. SPRAGUE 2,959,158

INTERNAL STEAM ANNULUS WITHIN PRESSURE SHELL
FOR HYDROCARBON REACTOR

Filed Jan. 30, 1957

INVENTOR.
THEODORE S. SPRAGUE

BY

*J. P. Moran*

ATTORNEY

Nov. 8, 1960 T. S. SPRAGUE 2,959,158
INTERNAL STEAM ANNULUS WITHIN PRESSURE SHELL
FOR HYDROCARBON REACTOR
Filed Jan. 30, 1957 4 Sheets-Sheet 2

INVENTOR.
THEODORE S. SPRAGUE

BY

ATTORNEY

INVENTOR.
THEODORE S. SPRAGUE
BY
ATTORNEY

INVENTOR.
THEODORE S. SPRAGUE
BY
ATTORNEY

United States Patent Office 2,959,158
Patented Nov. 8, 1960

2,959,158

INTERNAL STEAM ANNULUS WITHIN PRESSURE SHELL FOR HYDROCARBON REACTOR

Theodore S. Sprague, Hewlett, N.Y., assignor to The Babcock & Wilcox Company, New York, N.Y., a corporation of New Jersey Filed Jan. 30, 1957, Ser. No. 637,133

7 Claims. (Cl. 122—494)

This invention relates to hydrocracking and carbon-gasifying apparatus and, more particularly, to such apparatus including novel features adapting the apparatus for safe operation at substantial superatmospheric pressures.

The invention has general applicability to high pressure processing apparatus, but it will be described, by way of a particular example, as used in a hydrocracking and gasifying process in which the lowest grade crude hydrocarbons and the poorest residuums (which latter are not refinable in the usual refinery equipment) may be utilized to produce gasoline or related hydrofractions. All of the excess carbon in the feedstock is gasified, resulting in a by-product high B.t.u. gas suitable for city pipeline distribution without any unreacted coke. High pressure operation in such a process, and in gas production processes generally, is of substantial economic advantage in that the by-product or synthesis gas, as produced, is at a relatively high superatmospheric pressure eliminating the necessity for pumps and other equipment to raise the pressure of the gas, such as would be necessary if the operation were carried out at substantially atmospheric pressure.

In the particular process selected by way of example of a use of the apparatus, a pressure vessel constructed in accordance with the invention is divided into three separate reaction zones. In the lowest zone, carbon deposited on a solid heat carrier, which latter is in a fluidized state, is partially reacted with steam and oxygen to form CO and $H_2$. This exothermic reaction also supplies the heat required for the cracking operation, raising the temperature of the heat carrier. The fluidized heat carrier, at the elevated temperature of, for example, 1800° F., is transported from the lower to the upper zone through a steam lift pipe. The upper zone has present therein gases from the lowermost zone, which have filtered upwardly through a Raschig ring packing in the intermediate or middle zone, and superheated vapor sprayed thereinto. The hydrocarbon feedstock, together with recycled oil, is sprayed into the upper zone, wherein it is cracked into distillates which are drawn out of the top of the vessel together with the other product gases.

In the cracking process, the heat carrier gives up the sensible heat above the substantially 1000° F. temperature of the upper zone, and is left with a deposit of carbon residue. The cooled heat carrier then gradually drains downwardly through the Raschig ring packing counter-current to the rising synthesis gas produced in the lower zone. In passing from the relatively cooler upper end of the intermediate zone downwardly to the relatively hotter bottom end thereof, the heat carrier has essentially all of its absorbed hydrocarbons stripped therefrom. This results in the production of very high gasoline yields from a given quantity of feedstock, as well as production of high B.t.u. fuel gas.

The reaction or combustion chamber has a lateral tube wall enclosure comprising a circular row of upwardly extending liquid conducting or vapor generating tubes. Liquid is supplied to these tubes, and the heat developed in the process is used to generate vapor under pressure from the liquid. The saturated vapor under pressure is utilized in a novel manner to prevent leakage of hydrocarbons or vapors out of the reaction zone, and may also be used as part of the process steam, where the liquid is generated from water. Alternatively, another incombustible fluid in a gaseous state, such as an inert gas, may be used in place of the generated vapor to prevent such leakage, and all the generated vapor may be utilized in the process.

More specifically, the pressure vessel includes a circumferential bank or row of liquid conducting tubes with their interspaces sealed, these tubes having a refractory lining of substantial thickness covering their inner surfaces. The circular row of tubes is enclosed within a cylindrical outer casing having a diameter substantially greater than that of the tube row so as to form an annulus therewith. This annulus space between the water wall and the outer casing is filled with an incombustible fluid in a gaseous state, such as steam or an inert gas, at a pressure greater than that existing in the reaction chamber. Proper pressure differentials may be automatically maintained, when the gaseous incombustible fluid is steam, by discharging steam generated in the water walls through the annulus and thence through a pressure reducing connection into the lower end or lower zone of the reactor. Thereby, any crack in the water wall enclosure will result in steam leakage into the reaction chamber rather than leakage of hot gases outwardly against the pressure casing or shell.

The use of saturated steam as the pressure sealing fluid in the annulus space insures maintenance of uniform metal temperatures both in the water wall enclosure and in the outer casing, thus minimizing thermal stresses. The tubes are connected to an upper header connected to a horizontal drum acting as a liquid and vapor separator, the drum being connected by downcomers to an annular header at the lower ends of the tubes. The vapor space of the drum is connected into the upper end of the outer casing, where baffle means cause it to circulate over the relatively hot product outlet and thence into the annular space between the pressure casing and the tube wall.

Saturated steam is supplied through an inlet, disposed within the refractory lining on the inner surface of the tube wall, to a superheater having a superheated steam outlet conduit disposed within the refractory lining of the intermediate and upper zones. This outlet conduit conducts the process steam to an annular spray ring at the upper end of the upper zone which sprays steam into the reactor to react with the feedstock and the partly reacted gas filtering upward through the Raschig ring packing. The oxygen is introduced into the lower end of the lower zone as an oxygen and steam mixture, the introduction conduits being steam jacketed for heat protection.

A feature of the invention is the support of the lift pipe on the support means for the Raschig ring packing. This allows a "plug" containing all the lower reactants introduction elements in the lower zone, to be withdrawn for inspection, maintenance, or repair without disturbing the lift pipe. A further feature of the invention is the supporting of the upper end of the casing on a suitable structural framework expansion permitting an upper head to be removed for withdrawal of the components in the upper end of the reaction chamber for maintenance, inspection or repair.

To provide additional insurance against collapse of the water wall due to high pressure, the water wall is preferably reinforced with stiffener rings at present spacings vertically or upwardly of the reactor, and each water wall tube is bolted to the flange of a stiffener ring through suitable tapped spacer pads welded to the tubes. The tubes are preferably assembled in groups of four, for example, united by strips continuously welded to adjacent tubes in the interspaces between the tubes. The groups of tubes are then joined by welding the outer tubes of adjacent groups to each other. This forms a technical polygonal cross-section for the row of water wall tubes, but the polygonal cross-section closely approximates a circle.

All connections through the shell or casing containing fluids at other than saturation temperature are provided with thermal sleeves. As stated, in the case of the oxygen connections, these sleeves are connected to the annulus to receive steam at higher pressure therefrom so that any leakage will be inward.

There is a high gas pressure drop along the longitudinal axis of the reactor chamber which, combined with an abrasive laden atmosphere, may permit leakage of gas through the zones through the refractory. To stop any such leakage, metal vapor stops are provided at preset intervals for the full height of the reaction chamber, these stops being continuously welded to form a gas tight barrier in the lower bed, and in the Raschig ring section, the vapor stops further serve as sectional supports for the brickwork whereas, in the upper zone, they serve solely as vapor barriers.

For an understanding of the invention principles, reference is made to the following description of typical embodiments thereof as illustrated in the accompanying drawings. In the drawings.

Figure 1:
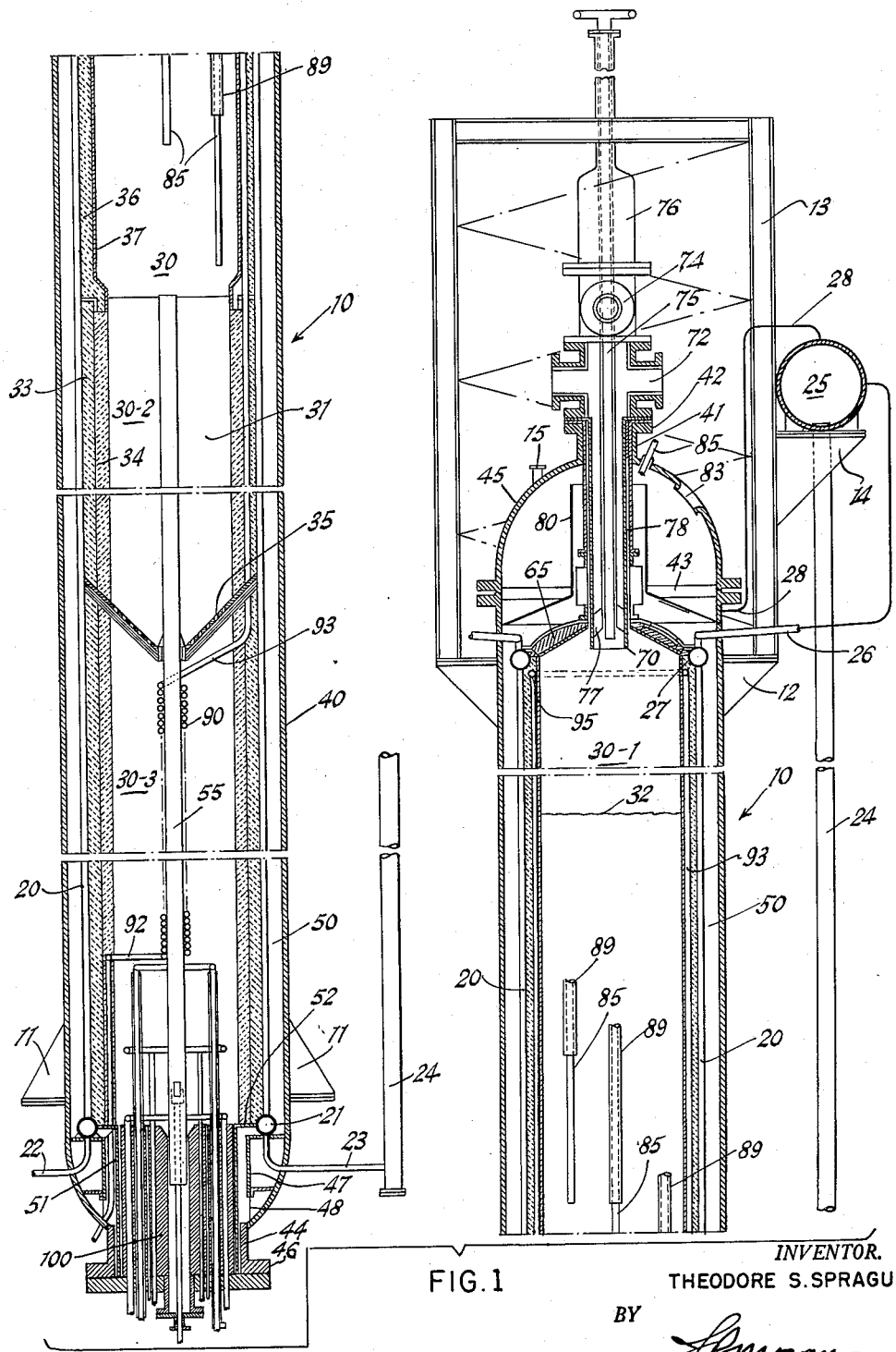
Fig. 1 is an axial sectional view through an apparatus embodying the invention.

Referring to the drawing, the invention is illustrated as embodied in heat exchange apparatus 10 comprising means, including a circumferential row of generally upright or vertical liquid conducting tubes 20, forming a sealed wall of a refractory-lined combustion or reaction chamber 30. A pressure-tight casing 40 surrounds the wall of the combustion chamber and forms therewith an interposed annulus space 50. In a manner, and by means, described more fully hereinafter, combustible reactants are introduced into chamber 30 for combustion and reaction therein to produce high temperature gaseous products of combustion or reaction.

Liquid, such as water, is supplied to tubes 20 from an annular lower header 21 having a liquid make-up inlet 22 and connected by supply conduits 23 to downcomers 24 connected to the liquid space of a liquid-vapor drum 25 near the upper end of apparatus 10. Means are provided for maintaining an incombustible fluid in the gaseous state in annulus space 50 at a pressure in excess of the pressure in chamber 30 to inhibit leakage of the reactants or reaction products from chamber 30 through wall 20 into annulus 50. The incombustible fluid in the gaseous state may be vapor or steam supplied from drum 25, or may be an inert gas such as nitrogen. The vapor or steam may be delivered to drum 25 for separation therein from the liquid by means of risers 26 connected to an upper annular header 27 interconnecting the upper ends of tubes 20. A vapor supply conduit 28 connects the vapor space of drum 25 to the interior of casing 40.

In the exemplary embodiment of the invention illustrated in the drawings, chamber 30 and casing 40 are preferably circular, and the apparatus 10, which has a height which is a relatively large multiple of its diameter, is designed for use in a combined hydrocracking and synthesis gas producing process. For carrying out this process, chamber 30 is divided into three superposed reaction zones, including an upper zone 30–1 comprising substantially the upper half of the chamber, and intermediate and lower zones 30–2 and 30–3 sharing the lower half of the chamber. Intermediate zone 30–2 comprises a packing 31 of Raschig rings extending upwardly from screen means 35 in turn supported from wall tubes 20. Screen means 35, described more fully hereinafter, separates the intermediate and lower zones of chamber 30.

Lower zone 30–3 is substantially filled with a solid heat carrier 32 in the fluidized state, such as, for example, —20 mesh alumina. Carbon carried by the heat carrier 32 is partially reacted, in the lower zone, with steam and oxygen, introduced into this zone, to form CO and $H_2$. This exothermic reaction elevates the temperature of the heat carrier to a relatively high value, such as 1800° F., required for the hydrocracking operation. The high temperature heat carrier is then transported to the upper zone 30–1 through a steam lift pipe extending axially of chamber 30 to just above Raschig ring packing 31, pipe 55 being supported from screen means 35. The heat carrier preferably fills the upper zone 30–1 to a level well over half the height of this zone.

In the upper zone 30–1, heat carrier 32 is in intimate contact with the synthesis gas from the lower zone, which filters upwardly through the Raschig ring packing of intermediate zone 30–2, and with hydrocarbon feed stock and recycle oil sprayed into the upper zone. The reactants sprayed into upper zone 30–1 are cracked into distillates which pass through an overhead outlet or gas offtake together with the synthesis gas. In the cracking process, the heat carrier gives up its sensible heat above the 1000° F. temperature of upper zone 30–1, and is left with a carbon residue deposited thereon. The spent heat carrier drains down through Raschig ring packing 31 countercurrently to the rising synthesis gas. In this passage to the lower zone 30–3, the heat carrier 32 is essentially completely stripped of all absorbed hydrocarbons, resulting in very high gasoline yields from a given quantity of feed stock. The synthesis gas reaction is essentially completed in the presence of superheated steam sprayed into the upper zone.

An excess of carbon, amounting to about 15–25% by weight of the heat carrier, is maintained in chamber 30 at all times. The carbon gasification rate in lower zone 30–1 is adjusted by adjusting the oxygen flow rate, and the 1000° F. temperature of upper zone 30–3 is maintained or regulated by adjusting the rate of heat carrier circulation.

Apparatus 10 is supported in the upright position by a suitable structural framework (not shown) including support brackets 11 welded or otherwise secured to the outer surface of casing 40. Other brackets 12 adjacent the upper end of casing 40 support a rigging steel framework 13 including brackets 14 supporting drum 25.

It will be noted from the above description that reactants are introduced into both the upper zone 30–1 and the lower zone 30–3 of chamber 30, and the gaseous reaction products are withdrawn from the upper zone. For this reason, pressure casing 40, which may, for example, be a metal shell designed for 500 p.s.i. pressure in accordance with the ASME code for unfired pressure vessels, has openings in both its upper and lower ends.

The upper end of vessel 40 is closed by a hemispherical head 45 having a flange, removably secured to a flange on the upper end of casing 40, and a tubular axial extension 41 with a flange 42 on its outer end. A seal 43 is welded around the inside of the joint between casing 40 and head 45. The hemispherical lower end of casing 40 has a relatively large diameter axial opening in which is welded a tubular nozzle-like extension 44 having a flange 46 on its outer end.

The means, including tubes 20, defining reaction chamber 30 are supported on the lower end of casing 40. The support means includes an annular, substantially box-shape shelf or bracket 47 formed of a pair of angles preferably welded at their outer ends of the inner surface of casing 40. A tubular sealing diaphragm 48 extends between the joined ends of the angles and casing 40 just outwardly of extension 44. Bracket or shelf 47 supports lower header 21, the connections 22 and 23 to the header extending through bracket 47. A tubular sleeve 51 extends in telescoped, slightly spaced relation through extension 44 terminating flush with the lower end of the latter, and has a radial flange 52 on its upper end welded to header 21 and braced by gussets 53. Flange 52 supports the refractory lining of reaction chamber 30, which covers the inner surfaces of wall tubes 20.

Figures 4, 5:
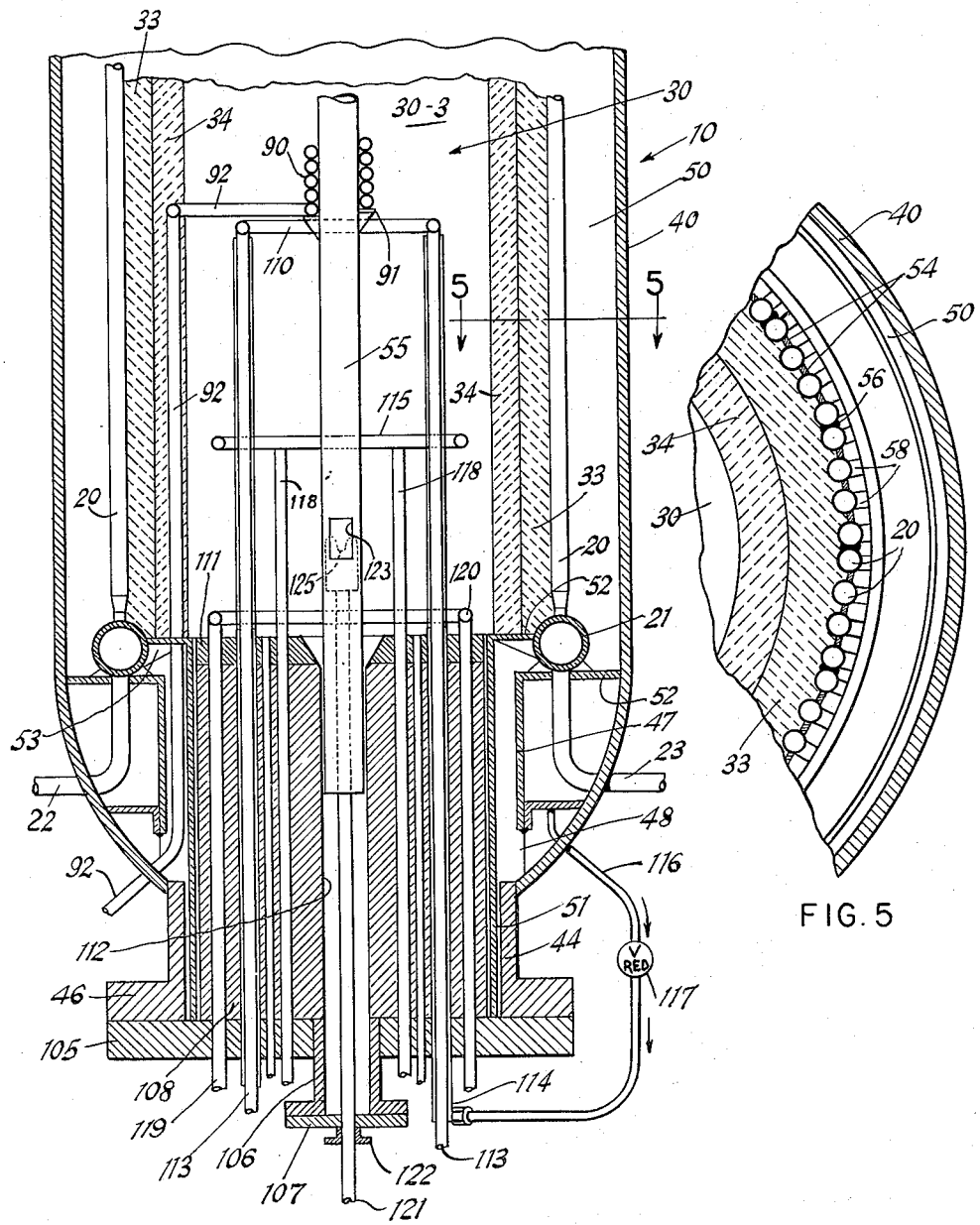
Fig. 4 is an enlarged axial sectional view of the lower part of the lower zone of the reaction chamber.
Fig. 5 is a diametric sectional view taken on the line 5—5 of Fig. 5.

These wall tubes are assembled in banks, each comprising four tubes, for example, as best seen in Fig. 5. The inter-tube spaces between the tubes of a bank are sealed by elongated metal bars 54 welded along their edges to adjacent tubes. The outer tubes of the tube banks assembled to form the "circumferential" row are then sealed to each other by welds 56 extending longitudinally therebetween. It will be noted from Fig. 5 that the tube wall, in horizontal section, is actually a many-sided polygon approaching a circle, and the term "circumferential row" as used herein and in the appended claims is intended to encompass the many-sided polygon arrangement, as just described, as well as an arrangement wherein tubes 20 are arranged to form a circular row.

In order to prevent collapse of the tube wall should the pressure differential between chamber 30 and annulus space 50 become excessive, tubes 20 are braced by stiffener rings 57 embracing the tube wall at spaced intervals, such as 30" for example, along the tube wall. Each tube 20 has a pad 58 welded thereto and tapped to receive bolts securing the tube to the H-shape stiffener rings 57. Insurance against a collapse due to excessive pressure differentials is provided also by a connection 61 connecting the interior of head 45 to a charge pipe 15 for the heat carrier 32. Charge pipe 15 extends, in a manner not shown in detail, through head 45 and into reaction chamber 30, the pipe extending through a thermal sleeve 16 including an expansion joint 17. Connection 61 thus interconnects annulus space 50 and chamber 30, and this connection contains a pressure relief valve 60 operable, upon attainment of a predetermined pressure differential (such as, for example, 50 p.s.i.) between chamber 30 and space 50, to open and equalize the pressures in chamber 30 and space 50.

The refractory lining of chamber 30 is supported on flange 52 and on supports secured to tubes 20. In the intermediate zone 30–2 and lower zone 30–3, the linings comprise a 4" thick outer section 33 of insulating firebrick shapes against tubes 20 and a 4" thick inner section 34 of firebrick shapes having good resistance to abrasion and suitable for use in strongly reducing atmospheres. The lining of the upper zone 30–1 comprises a 5" thick outer section 36 of lightweight insulating concrete shapes, and a 1" thick inner section 37 of high strength abrasion resistance cast refractory reinforced by a steel mesh (not shown) secured to studs 38 on tubes 20.

Figure 2:
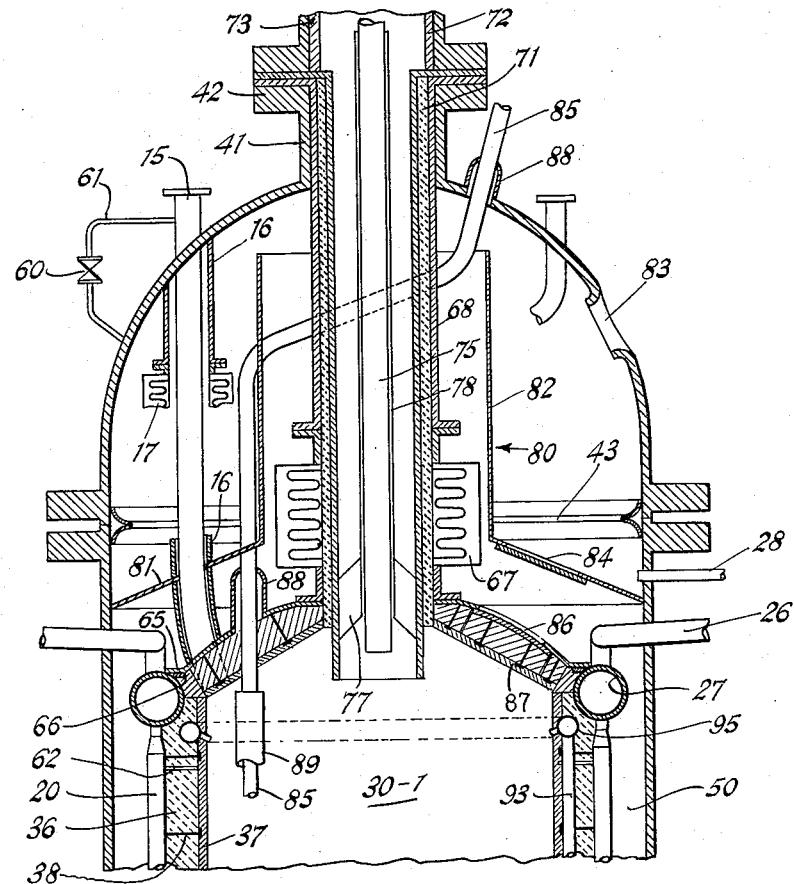
Fig. 2 is an enlarged axial sectional view of the upper end of the upper zone of the reaction chamber.

In carrying out the process to which the apparatus 10 is particularly adaptable, there is a high gas pressure drop longitudinally of the reaction chamber, combined with a dust laden atmosphere. For this reason, metal vapor stops 62 are disposed at regularly spaced intervals along the full height of the reaction chamber. These stops are continuously welded to wall tubes 20 to form gas tight barriers in the refractory lining of chamber 30. In the intermediate and lower zones, stops 62 act also as supports for the refractory lining, being braced by gussets 63. In the upper zone 30–1, elements 62 act only as vapor stops. Horizontal expansion joints beneath each vapor stop are packed with a mineral wool 64 retaining its resilience at temperatures well above the temperature of the lower zone 30–3. To simplify the illustration, vapor stops 62 are not illustrated in Figs. 1 and 2.

The upper end of reaction chamber 30 is closed by a metal rupture diaphragm 65 having a refractory lining, on its inner surface, of the same type as the lining 36–37 of upper zone 30–1. Diaphragm 65 is sealed at its outer edge to an annular ring 66 welded to the upper inner quadrant of header 27. The inner margin of diaphragm 65 is sealingly connected to the lower end of an expansion joint 67 whose upper end is connected to a thermal sleeve 68 surrounding a gas offtake pipe 70.

An insulating liner 71 is disposed between sleeve 68 and pipe 70, and the sleeve and pipe have radial flanges on their outer ends superposed on each other and on flange 42 of extension 41. Thereby, the sleeve and pipe are clamped in position on flange 42 by a connection member 72 having a flange secured to flange 42. Member 72 has an insulating liner 73 on its inner surfaces as does also a second flanged connection member 74 secured to member 72.

A housing 76 for a soot blower 75 is mounted on member 74, and the lower end of pipe 70 has braces 77 mounted thereon and positioning a guide sleeve 78 for the soot blower. Thermal protection for head 45, from the hot gases flowing through offtake pipe 70, is further provided by a baffle 80 which directs the incombustible fluid under pressure and in the gaseous state supplied to annulus space 50 to sweep over the inner surface of head 45, around sleeve 68 and joint 67, and over rupture diaphragm 65. Baffle 80 comprises an annular frusto-conical base 81 secured to casing 40 joint below steam inlet 28, and a cylindrical and axial upper part or sleeve 82 surrounding the gas offtake parts and extending to near the top of head 45. Thus, the saturated steam, or other incombustible fluid in the gaseous state, supplied through inlet 28 first sweeps upwardly over the inner surface of head 45, then down through baffle section 82 around sleeve 68 and joint 67, then outwardly between baffle base 81 and diaphragm 65, and thence into annulus space 50.

Head 45 is provided with a normally closed access opening 83. However, for access to combustion or reaction chamber 30, the entire head 45 and its supported parts are removable with the assistance of suitable rigging on framework 13. Base 81 of baffle 80 has a normally closed manhole 84 aligned with a normally closed manhole 86 in diaphragm 65, the cover 87 of this latter manhole having its inner surface refractory-lined in the same manner as the diaphragm 65.

The feedstock and re-cycled oil are introduced into upper zone 30–1 of reaction chamber 30 by feed lines 85 extending through thermal sleeves 88 in head 45 and diaphragm 65. In chamber 30, these feed lines extend through protective sleeves 89. In the illustrated embodiment of the invention, three feed lines 85 are provided each terminating at a different level of zone 30–1 for uniform distribution of the hydrocarbon reactants.

Superheated reaction steam is also supplied to upper zone 30–1 from a superheater 90 comprising a helical coil embracing lift pipe 55 in lower zone 30–3 and supported on a shelf 91 secured to pipe 55. Superheater 90 which forms the subject matter of the copending application of A. B. Steever, Serial No. 637,113, filed January 30, 1957, acts as a thermal protector for lift pipe 55. Saturated steam at a pressure of, for example, 450 p.s.i., is supplied to the lower end of superheater 90 by a supply line 92 entering through the lower end of casing 40 and extending between bracket 47 and sleeve 51. Line 92 is encased in inner refractory lining section 34 through which it extends for some distance upwardly until it is bent radially inwardly to connect with the lower end of superheater 90.

Figure 3:
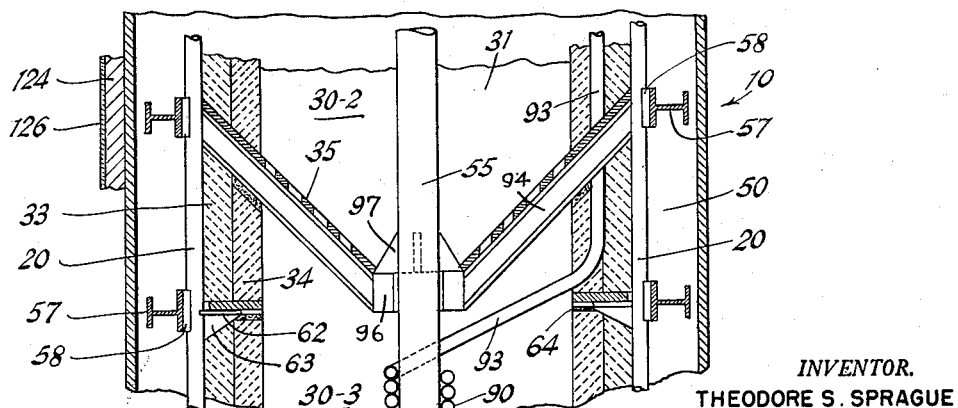
Fig. 3 is an enlarged axial sectional view of one form of support for the Raschig rings.

Superheater 90 terminates just below screen 35, and the superheated steam flows through a line 93 from the upper end of the superheater coil. Line 93 extends radially outwardly and upwardly (Fig. 3) into lining section 34 and thence upwardly through this lining section and between lining sections 36 and 37 to an annular spray ring 95 at the upper end of zone 30-1.

Lift pipe 55 is supported solely from the screen support for Raschig rings 31. This allows all the reactant introduction means for lower zone 30-3 to be mounted through a removable plug 100 closing the lower end of reaction chamber 30 and casing 40. In the screen arrangement shown in Figs. 1 and 3, the support screen 35 comprises a perforated annular frusto-conical support plate 35 carried by radial arms or brackets 94 secured, at their outer ends, to wall tubes 20 and, at their inner ends, to a ring 96 embracing pipe 55. The pipe is supported on ring 96 by means of brackets 97.

Figure 7:
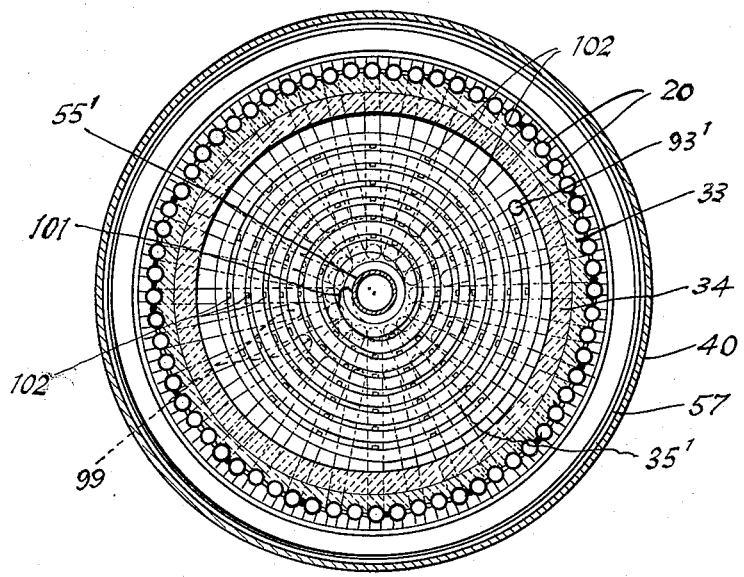
Fig. 7 is a plan view of the support shown in Fig. 6.
Figure 6:
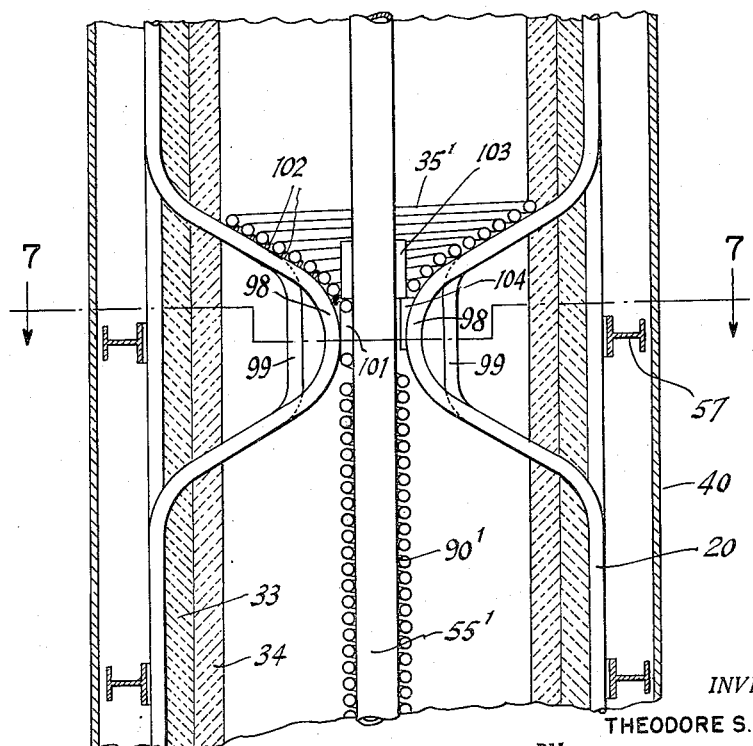
Fig. 6 is a view, similar to Fig. 3, of a modified support for the Raschig rings.

An alternative support arrangement for Raschig rings 31 is shown in Figs. 6 and 7. In this arrangement, superheater 90' forms the support screen 35'. Every third tube, for example, of wall tubes 20 is bent inwardly, upwardly, and then outwardly as at 98, 99 to form a throat through which pipe 55' extends. The coil of superheater 90' is extended through this throat alongside pipe 55', as at 101, and then formed as a frusto-conical, upwardly expanding helix forming the screen 35'. Studs 102 on the upper runs of bent tube portions 98, 99 space adjacent convolutions of screen coil 35' from each other, and the outermost convolution is continued upwardly through the refractory lining as the superheated steam line 93'. A collar 103 secured to pipe 55' is supported on bars 104 on the inner ends of bent tube portions 98.

The removable "plug" 100 includes an annular plate 105 removably secured to flange 46 of lower tubular extension 44 and sealingly abutting the lower end of sleeve 51 to separate chamber 30 from annulus space 50. A flanged tubular sleeve 106 is mounted axially of plate 105 and has an annular closure plate 107 secured to its lower outer end. Plate 105 supports a cylinder or annular plug 108 of built up lightweight refractory shapes, this cylinder fitting closely within sleeve 51 and having a layer 111 of plastic refractory material on its upper end substantially flush with the upper end of sleeve 51. Cylinder 108 has an axial opening 112 forming a continuation of sleeve 106 and having a flared upper opening through refractory layer 111. The lower end of lift pipe 55 has a loose fit in passage 112.

An oxygen and steam mixture is introduced into lower zone 30-3 by inlet pipes 113 connected to a spray ring 110 located just below superheater 90. Pipes 113 extend through jacket sleeves 114 in plug 100 communicating at their upper ends with chamber 30, and sleeves 114 are supplied with steam from annulus space 50. For this purpose, space 50 is provided with an outlet pipe 116 connected through a suitable pressure reducing valve 117 and a header to jacket sleeves 114. Additional steam, from a separate source of supply, is delivered to zone 30-3 by pipes 118, connected to an intermediate spray ring 115, and pipes 119, connected to lower spray ring 120.

Lift steam for pipe 55 is supplied by a conduit 121 connected through a sealing nipple 122 in plate 107. Conduit 121 also supplies steam for operating a piston type gate valve 125 controlling the opening 123 in pipe 55 for entry of the heat carrier 32 thereinto.

It will be noted that additional pipes and conduits extend through head 45 and plug 100, and these are used for auxiliary equipment such as sampling and testing apparatus, safety valves, and pressure connections. The process heat transfer to wall tubes 20 results in generation of saturated steam at a pressure of, for example, 450 p.s.i., which is delivered from drum 25 to annulus space 50 by line 28. The connection between annulus space outlet 116 and the jackets 114 for the oxygen and steam mixture pipes 113 includes a pressure reducing valve which reduces the steam pressure delivered into zone 30-3 by jackets 114 to a value about 20 p.s.i. below the pressure in annulus space 50. Pressure relief valves are provided on the drum 25 for relieving pressure when the pressure exceeds a pre-set higher value such as 500-550 p.s.i. The pressure equalization valve 60 in line 61 operates at about a 50 p.s.i. pressure differential between the pressure in chamber 30 and that in space 20. The fact that saturated steam is in contact with both surfaces of tubes 20 and with the inner surface of casing 40 minimizes thermal stresses in these parts. The bellows type expansion joint 67 in the offtake pipe provides for possible differences in cooling rates between the water walls 20 and shell 40, which might occur in the event of rapid depressurization of reaction chamber 30. Gas safety valves located downstream of the offtake pipe 70 provide protection against excessive pressure within chamber 30. The diaphragm 65 is designed to fail at a bursting pressure above the pressure differential set by valve 60, thus releasing gas into the annulus space 50 which is protected by pressure relief valves.

All connections through shell or casing 40 which contain fluids at other than saturation temperature are provided with thermal sleeves. The casing 40 is provided with a covering of insulation 124 protected with weatherproofing 126. This minimizes heat loss from the process and helps maintain the casing 40 at saturation temperature.

All metal parts located in the intermediate zone 30-2 and the lower zone 30-3 are constructed of a high alloy steel suitable for use in corrosive atmosphere. This includes the lift pipe 55, the valve 125, the Raschig rings 31, the refractory supports 62 and 63, the superheater 90, and the Raschig ring support grid or screen 35 or 35'.

The superheater is designed to deliver approximately 1000 lbs./hr. of superheated steam at 1200° F.

It will be noted that some of the saturated steam for the process is supplied from the annulus space 50, and this amount will vary in accordance with operating factors. The balance of the process steam is supplied from a suitable separate source of steam. Also, where an inert gas such as nitrogen is readily available in quantity, such a gas may be used as the pressurizing medium in annulus space 50.

While specific embodiments of the invention have been shown and described in detail to illustrate the application of the invention principles, it will be understood that the invention may be embodied otherwise without departing from such principles.

What is claimed is:

1. Heat exchange apparatus comprising, in combination, means including a circumferential row of upright vapor generating tubes with sealed inter-tube spaces forming a wall of a combustion chamber; means for introducing combustible reactants into said chamber for combustion therein to produce high temperature gaseous products of combustion; a pressure tight casing surrounding said wall and forming therewith an interposed annulus space; a liquid and vapor drum connected to the discharge ends of said tubes, means for supplying liquid to said tubes for generation of vapor by heat transfer from said gaseous products of combustion; and means connecting the vapor space of said drum to said annulus space for supplying the generated vapor to said annulus space at a pressure therein in excess of the pressure in said chamber to inhibit leakage of the combustible reactants and gaseous products of combustion from said chamber outwardly into said annulus space; the reactant introduction means including conduit means extending into the lower end of said chamber for introducing a mixture of steam and oxygen thereinto; jacket means embracing said conduit means and communicating with said chamber; and means, including pressure reducing means, connecting said annulus space to said jacket means to protect said conduit means with vapor from said annulus space and to introduce the vapor, at a reduced pressure, into said chamber as a reactant.

2. Heat exchange apparatus comprising, in combination, means including a circumferential row of substantially upright vapor generating tubes with sealed inter-tube spaces forming a wall of a combustion chamber for containing a fluidized solid heat carrier circulating therethrough; a pressure tight casing surrounding said wall and forming therewith an interposed annulus space; means for introducing combustible reactants into said chamber for combustion therein to produce high temperature gaseous products of combustion and to raise the temperature of the heat carrier; means for supplying liquid to said tubes for generation of vapor by heat transfer from said gaseous products of combustion; means for maintaining a gaseous fluid in said annulus space at a pressure in excess of the pressure in said chamber to inhibit leakage of the combustible reactants and gaseous products of combustion from said chamber outwardly into said annulus space; perforate support means extending inwardly from said tubes at a level intermediate the upper and lower ends of said chamber to provide for passage of the heat carrier downwardly through said support means; and a heat carrier lift pipe extending axially of said chamber and supported intermediate its ends on said support means; said lift pipe have a discharge opening at its upper end and an inlet opening for said heat-carrier adjacent its lower end, a piston valve responsive to pressure of lifting fluid positioned in said lift pipe adjoining said inlet opening to regulate the flow of heat carrier into the pipe, and conduit means opening into the lower end of said heat carrier lift pipe to supply lifting fluid to said pipe for moving the heat carrier upwardly therethrough.

3. Heat exchange apparatus comprising, in combination, means including a circumferential row of substantially upright vapor generating tubes with sealed inter-tube spaces forming a wall of combustion chamber for containing a fluidized solid heat carrier circulating therethrough; a pressure tight casing surrounding said wall and forming therewith an interposed annulus space; means for introducing combustible reactants into said chamber for combustion therein to produce high temperature gaseous products of combustion and to raise the temperature of the heat carrier; means for supplying liquid to said tubes for generation of vapor by heat transfer from said gaseous products of combustion; means for maintaining a gaseous fluid in said annulus space at a pressure in excess of the pressure in said chamber to inhibit leakage of the combustible reactants and gaseous products of combustion from said chamber outwardly into said annulus space; means sealing said chamber from said annulus space; a heat-resistant lining for said chamber including non-metallic refractory material on the inner surface of said wall; a removable closure for an end of said chamber having an annulus plug of non-metallic refractory material on its inner surface, the reactant introduction means being mounted through said closure and its lining plug and removable as a unit therewith; the opening receiving said closure forming an access manway into said chamber; perforate support means extending inwardly from said tubes at a level intermediate the upper and lower ends of said chamber to provide for passage of the heat carrier downwardly through said support means; a heat carrier lift pipe extending axially of said chamber and supported intermediate its ends on the inner ends of said support means, the lower end of said pipe extending into the axial opening of said plug, said lift pipe having a discharge opening at its upper end and an inlet opening for said heat carrier adjacent its lower end, a piston valve responsive to pressure of lifting fluid positioned in said lift pipe adjoining said inlet opening to regulate the flow of heat carrier into the pipe, and conduit means extending through said closure and the plug opening into the lower end of said heat carrier lift pipe to supply lifting fluid to said pipe for moving the heat carrier upwardly therethrough.

4. Apparatus as claimed in claim 2 including screen means on said support means dividing said chamber into zones; and a stationary permeable refractory packing supported on said screen means; the upper end of said pipe extending to the upper surface of said packing.

5. Apparatus as claimed in claim 4 including reactant introduction means extending into said chamber above the upper surface of said packing.

6. Apparatus as claimed in claim 4 in which said support means comprises brackets secured to said tubes; and said screen means comprises a perforated plate supported on said brackets.

7. Apparatus as claimed in claim 4 in which said support means comprises inwardly bent portions of said tubes; and said screen means comprises a fluid conducting coil having spaced convolutions supported on said bent tube portions; and means for supplying fluid in vapor form to said coil.

References Cited in the file of this patent

UNITED STATES PATENTS

| | | |
|---|---|---|
| 2,397,432 | Records | Mar. 26, 1946 |
| 2,534,208 | Reed et al. | Dec. 12, 1950 |
| 2,561,393 | Marshall | July 24, 1951 |
| 2,561,394 | Marshall | July 24, 1951 |
| 2,625,140 | Weir | Jan. 13, 1953 |

FOREIGN PATENTS

| | | |
|---|---|---|
| 689,126 | Great Britain | Mar. 18, 1951 |
| 265,298 | Switzerland | Nov. 30, 1949 |